Figure 1:
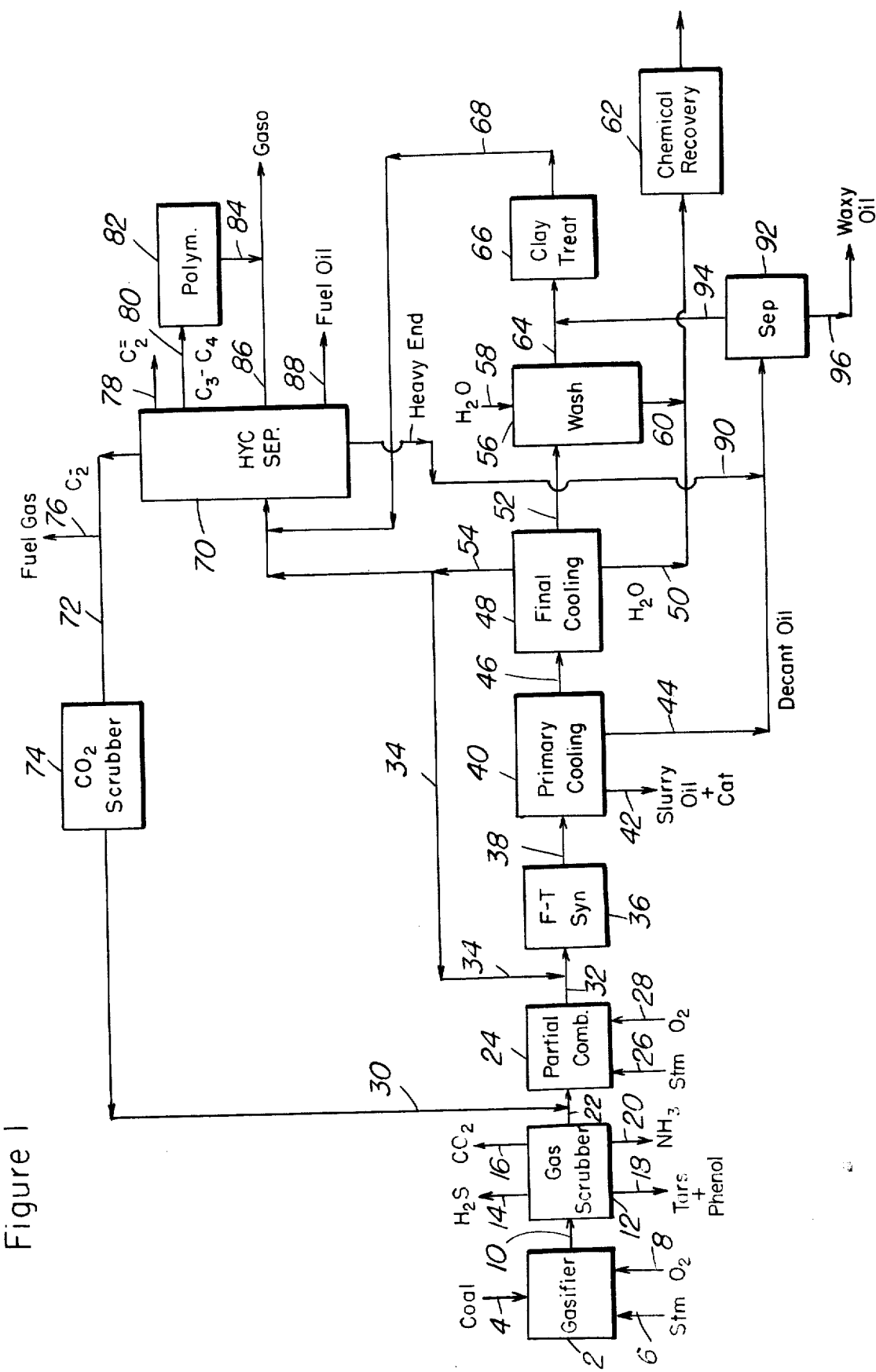

United States Patent [19]

Kuo

[11] 4,046,830

[45] Sept. 6, 1977

[54] METHOD FOR UPGRADING FISCHER-TROPSCH SYNTHESIS PRODUCTS

[75] Inventor: James C. Kuo, Cherry Hill, N.J.

[73] Assignee: Mobil Oil Corporation, New York, N.Y.

[21] Appl. No.: 614,586

[22] Filed: Sept. 18, 1975

[51] Int. Cl.$^2$ .............................................. C07C 1/04
[52] U.S. Cl. ........................... 260/676 R; 208/79; 208/88; 208/93; 208/120; 208/135; 260/449 R; 260/450
[58] Field of Search ............ 260/676, 449 R, 449 M, 260/449.5, 449.6, 450; 208/57, 64, 79, 88, 93

[56] References Cited

U.S. PATENT DOCUMENTS

| 2,740,804 | 4/1956 | Glazier | 260/450 |
|---|---|---|---|
| 2,752,382 | 6/1956 | Garrett et al. | 260/450 |
| 3,172,842 | 3/1965 | Paterson | 208/79 |
| 3,700,585 | 10/1972 | Chen et al. | 208/111 |
| 3,729,409 | 4/1973 | Chen | 208/135 |
| 3,760,024 | 9/1973 | Cattanach | 260/673 |
| 3,843,510 | 10/1974 | Morrison et al. | 208/111 |
| 3,928,483 | 12/1975 | Chang et al. | 260/668 R |
| 3,960,978 | 6/1973 | Givens et al. | 260/683.15 |

OTHER PUBLICATIONS

Asinger, Paraffins Chemistry & Technology, Pergammon Press, N. Y. (1968), pp. 3, 123-125, 131, 132, 136, 138.

Primary Examiner—C. Davis
Attorney, Agent, or Firm—Charles A. Huggett; Carl D. Farnsworth

[57] ABSTRACT

The total product effluent of Fischer-Tropsch synthesis separated from catalyst fines is passed in contact with a crystalline zeolite catalyst represented by ZSM-5 before separation into desired product fractions and $C_5$ minus gaseous products are catalytically converted to gasoline boiling components.

5 Claims, 2 Drawing Figures

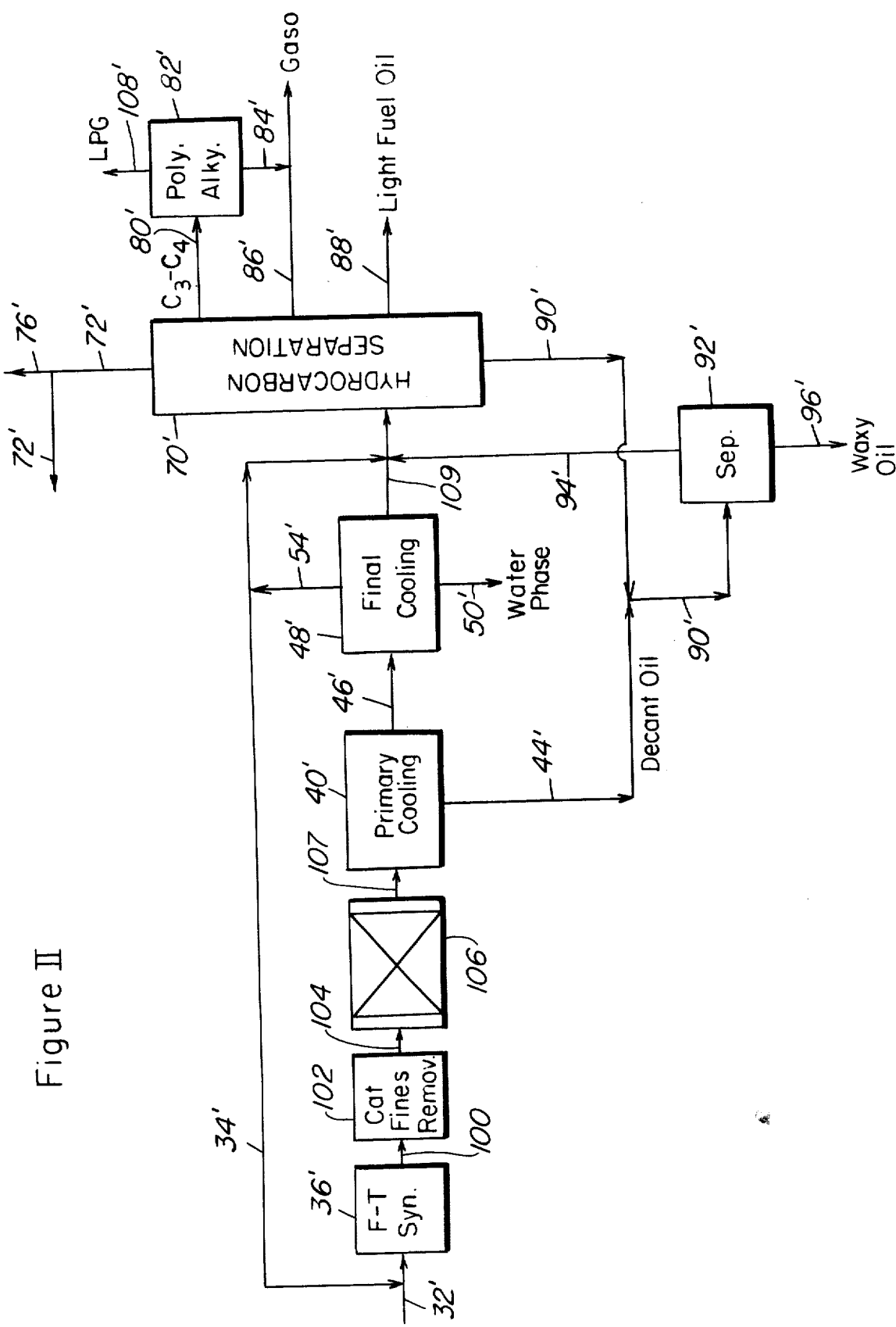
Figure II

METHOD FOR UPGRADING FISCHER-TROPSCH SYNTHESIS PRODUCTS

BACKGROUND OF THE INVENTION

1. Field of the Invention

This invention is concerned with a process for converting synthesis gas, i.e., mixtures of gaseous carbon oxides with hydrogen or hydrogen donors, to hydrocarbon mixtures and oxygenates. In one aspect, this invention is concerned with process for increasing the yield of hydrocarbon mixtures rich in aromatic hydrocarbons over that obtained in a known Fischer-Tropsch synthesis process. In still another aspect, this invention is concerned with providing a novel catalysts for improving the products obtained by the conversion of synthesis gas over the prior art catalysts.

2. Prior Art

Processes for the conversion of coal and other hydrocarbons such as natural gas to a gaseous mixture consisting essentially of hydrogen and carbon monoxide, or of hydrogen and carbon dioxide, or of hydrogen and carbon monoxide and carbon dioxide, are well known. Although various processes may be employed for the gasification, those of major importance depend either on the partial combustion of the fuel with an oxygen-containing gas or on a combination of these two reactions. An excellent summary of the art of gas manufacture, including synthesis gas, from solid and liquid fuels, is given in Encylcopedia of Chemical Technology, Edited by Kirk-Othmer, Second Edition, Volume 10, pages 353-433, (1966), Interscience Publishers, New York, New York, the contents of which are herein incorporated by reference. The techniques for gasification of coal or other solid, liquid, or gaseous fuel are not considered to be per se inventive here.

It is considered desirable to effectively and more efficiently convert synthesis gas, and thereby coal and natural gas, to highly valued hydrocarbons such as motor gasoline with high octane number, petrochemical feedstocks, liquefiable petroleum fuel gas, and aromatic hydrocarbons. It is well known that synthesis gas will undergo conversion to form reduction products of carbon monoxide, such as hydrocarbons, at temperatures in the range of from about 300° to about 850° F under pressures in the range of from about one to one thousand atmospheres pressure, over a fairly wide variety of catalysts. The Fischer-Tropsch process, for example, which has been most extensively studied, produces a range of products including liquid hydrocarbons, a portion of which have been used as low octane gasoline. The types of catalysts that have been studied for this and related processes included those based on metals or oxides of iron, cobalt, nickel, ruthenium, thorium, rhodium, and osmium.

The wide range of catalysts and catalysts modifications disclosed in the art and an equally wide range of conversion conditions for the reduction of carbon monoxide by hydrogen provide considerable flexibility toward obtaining selected boiling-range products. Nonetheless, in spite of this flexibility, it has not proved possible to make such selections so as to produce liquid hydrocarbons in the gasoline boiling range which contain highly branched paraffins and substantial quantities of aromatic hydrocarbons, both of which are required for high quality gasoline, or to selectively produce aromatic hydrocarbons particularly rich in the benzene to xylenes range. A review of the status of this art is given in "Carbon Monoxide-Hydrogen Reactions", Encyclopedia of Chemical Technology, Edited by Kirk-Othmer, Second Edition, Volume 4, pp. 446-488, Interscience Publishers, New York. N.Y., the text of which is incorporated herein by reference.

Recently, it has been discovered that synthesis gas may be converted to oxygenated organic compounds and these then converted to higher hydrocarbons, particularly high octane gasoline, by catalytic contact of the synthesis gas with a carbon monoxide reduction catalyst followed by contacting the conversion products so produced with a special class of crystalline zeolite catalyst in a separate reaction zone. This two-stage conversion is described in copending U.S. patent application Ser. No. 387,220, filed on Aug. 9, 1973. Compositions of iron, cobalt or nickel deposited in the inner absorption regions of crystalline zeolites are described in U.S. Pat. No. 3,013,990. Attempts to convert synthesis gas over X-zeolite base exchanged with iron, cobalt and nickel are described in Erdol and Kohle - Erdgas, Petrochemie: Brennstoff - Chemie, Vol. 25, No. 4, pp. 187-188, April 1972.

SUMMARY OF THE INVENTION

This invention is concerned with improving the product distribution and yield of products obtained by a Fischer-Tropsch synthesis gas conversion process. In a particular aspect, the present invention is concerned with improving the product yield, product distribution, and operating economies of a synthesis gas conversion operation known in the industry as the Sasol process.

The Sasol process located in South Africa and built to convert an abundant supply of poor quality coal products to particularly hydrocarbons, oxygenates and chemical forming components was a pioneering venture. The process complex developed is enomorous, expensive to operate, and may be conveniently divided or separated into (1) a synthesis gas preparation complex from coal, (2) a Fischer-Tropsch type of synthesis gas conversion in both a fixed catalyst bed operation and a fluid catalyst bed operation coupled to take advantage of the respective processing systems, (3) a product recovery operation and (4) an auxiliary plant and utility operations required in such a complex.

The extremely diverse nature of the products obtained in the combination operation of the Sasol process amplifies the complexity of the overall process arrangement and its operating economics. The Sasol synthesis operation is known to produce a wide spectrum of products including fuel gas, light olefins, LPG, gasoline, light and heavy fuel oils, waxy oils and oxygenates identified as alcohols, acetone, ketones, and acids, particularly acetic and proprionic acid. The $C_2$ and lower boiling components may be reformed to carbon monoxide and hydrogen or the $C_2$ formed hydrocarbons and methane may be combined and blended for use in a fuel gas pipeline system.

In the Sasol operation, the water soluble chemicals are recovered as by steam stripping and separated into individual components with the formed organic acids remaining in the water phase separately treated. Propylene and butylene formed in the process are converted to gasoline boiling components as by polymerization in the presence of a phosphoric acid catalyst. Propane and butane on the other hand are used for LPG.

The present invention is concerned with improving a Fischer-Tropsch synthesis gas conversion operation and particularly is concerned with improving the product selectively and characteristics obtained therefrom. More particularly, the present invention is concerned with improving the product selectively of the Sasol syngas conversion operation.

FIG. I is a condensed schematic block flow arrangement of a Fischer-Tropsch process directed to the conversion of coal to synthesis gas comprising monoxide and hydrogen, the reduction of carbon monoxide by the Fischer-Tropsch Process to form a product mixture comprising hydrocarbon and oxygenates and the recovery of these products for further use.

FIG. II is a condensed schematic block flow arrangement for improving the process of FIG. I by employing the concepts of this invention.

Referring now to FIG. I, there is shown in block flow arrangement a substantially reduced process flow arrangement of a Fischer-Tropsch syngas conversion process. A coal gasifier section 2 is provided to which pulverized coal is introduced by conduit 4, steam by conduit 6 and oxygen by conduit 8. The products of gasifier section 2 are then passed by conduit 10 to a gas scrubber section 12. In scrubber section 12, carbon monoxide and hydrogen are separated from hydrogen sulfide removed by conduit 14, carbon dioxide removed by conduit 16, tars and phenols removed by conduit 18 and ammonia removed by conduit 20. The carbon monoxide-hydrogen rich gas is passed from section 12 by conduit 22 to a partial combustion zone 24 supplied with steam by conduit 26 and oxygen by conduit 28. Recycle $C_2$ fuel gas product of the combination process separated from carbon dioxide is recycled by conduit 30 to the partial combustion section 24. In the partial combustion operation of section 24, a carbon monoxide-hydrogen synthesis gas of desired ratio is formed for passage and use in a downstream Fischer-Tropsch synthesis gas conversion operation.

The Sasol process operates two version of the Fischer-Tropsch process; one being a fixed catalyst bed operation and the other being a fluid catalyst bed operation. Each of these operations use iron catalyst prepared and promoted to obtain desired catalyst composition and activity. The synthesis gas prepared as above briefly identified is passed by conduit 32 to the Fischer-Tropsch reaction section 36 in admixture with $C_2$ recycle gas introduced by conduit 34. Generally the synthesis gas feed is introduced at a temperature of about 160° C and at an elevated pressure of about 330 psig. The temperature of the synthesis gas admixed with catalyst in the fluid operation rapidly rises by the heat liberated so that the Fischer-Tropsch and water gas shift reactions take place. The products of the Fischer-Tropsch synthesis reactions are conveyed by conduit 38 to a primary cooling section 40 wherein the temperature of the mixture is reduced to within the range of 280° to about 400° F. In the primary cooling section a separation is made which permits the recovery of a slurry oil and catalyst stream as by conduit 42, and a decant oil stream by conduit 44. In one typical operation, the decant oil stream will have an ASTM/95% boiling point of about 490° C (914° F). A light oil stream boiling below about 500° F and more usually below about 450° F including lower boiling components comprising oxygenates is passed by conduit 46 to a second or final cooling and separating section 48 maintained at a temperature of about 100° F and an elevated pressure of about 265 psig. In section 48 a separation is made to recover a water phase comprising water soluble chemicals with oxygenates withdrawn by conduit 50, a light hydrocarbon oil phase comprising $C_5$ to about 500° F boiling hydrocarbons withdrawn by conduit 52 and a vaporous phase comprising $C_2$ and lower gaseous components withdrawn by conduit 54. A portion of the vaporous phase comprising unreacted carbon monoxide and hydrogen is recycled by conduit 34. In a typical operation about one volume of fresh feed is used with two volumes of the recycle gas. The lighter hydrocarbons do not completely condense and an absorber system is used for their recovery. Methane and LPG hydrocarbons are blended with other components for use in a pipe line system where desired. On the other hand they may be passed to the gas reforming section for conversion and recycle as feed gas in the synthesis operation. The light oil hydrocarbon phase received in conduit 52 is then passed through a water wash section 56 to remove water soluble components to which wash water is added by conduit 58. In wash section 56, water soluble materials comprising oxygenates are removed and withdrawn therefrom by conduit 60. The water phases in conduits 50 and 60 are combined and passed to a chemicals recovery operation 62. The washed hydrocarbon phase is removed by conduit 64 and passed to a clay treater 66 along with a hydrocarbon fraction boiling below about 600° F recovered from the decanted oil phase in conduit 44 and a heavy oil product fraction recovered as hereinafter described. The hydrocarbon phase thus recovered and passed to this clay treating section is preheated to an elevated temperature of about 600° F before contacting a silica/alumina catalyst or clay retained in the treater. This operation converts retained oxygenates and some alpha olefins in the product thereby imparting a higher octane rating to these materials. The treatment also operates to remove harmful acids and other oxygenates retained in the hydrocarbon phase after the water wash. The clay treated hydrocarbon product is then passed by conduit 68 to a hydrocarbon separation reaction 70. A portion of the hydrocarbon vapors in conduit 54 not directly recycled to the Fischer-Tropsch conversion operation by conduit 34 is also passed to the hydrocarbon separation reaction 70. In the hydrocarbon separation section 70, a separation is made to recover a flue gas stream comprising $C_2$ hydrocarbons and other components suitable for reforming to CO and $H_2$ withdrawn by conduit 72. A portion of this material is passed through $CO_2$ scrubber 74 before recycle by conduit 30 to the partial combustion zone 24. A portion of the fuel gas may be withdrawn for other use by conduit 76. In separation section 70, a $C_2$ olefin rich stream is recovered by conduit 78 by chemical processing as desired. A $C_3$ to $C_4$ hydrocarbon stream is withdrawn by conduit 80 and passed to catalytic polymerization in section 82. Polymerized material suitable for blending with gasoline product is withdrawn by conduit 84. A gasoline product fraction is recovered by conduit 86 and a light fuel oil product such as a No. 2 fuel oil is withdrawn by conduit 88. The heavy ends from separation section 70 is withdrawn by conduit 90 for admixture with the decant oil fraction in conduit 44 as mentioned above. The blend of hydrocarbon product thus formed will boil in the range of about 400° F to about 1000° F. This material blend is passed to a separator section 92 wherein a separation is made to recover a fraction boiling in the range of from about 400° to 650° F withdrawn by conduit 94 from a heavier waxy oil withdrawn by conduit 96.

In this relatively complicated synthesis gas conversion operation and product recovery, it is not unusual to recover a product distribution comprising 2% ethylene, 8% LPG, 70% gasoline boiling material, 3% fuel oil, 3% waxy oil and about 14% of materials defined as oxygenates.

FIG. II is a diagrammatic block flow arrangement of a processing scheme for converting Fischer-Tropsch synthesis gas products to a more acceptable product distribution including gasoline boiling range hydrocarbons.

Referring now to FIG. II by way of example, synthesis gas comprising carbon monoxide and hydrogen obtained as described in FIG. I is passed by conduit 32' in admixture with recycle synthesis gas in conduit 34' to a Fischer-Tropsch synthesis gas processing section 36' such as a fluid or fixed catalyst bed operation employed by known Fischer-Tropsch synthesis operations and described in the literature. The product effluent of this synthesis gas operation is passed by conduit 100 through a catalyst fines removal zone 102 particularly when employing a fluid catalyst and thence by conduit 104 to a reaction zone 106 housing a special class of crystalline zeolites represented by ZSM-5 crystalline zeolite. The total product effluent of the Fischer-Tropsch synthesis operation recovered after catalyst fines are removed will be at an elevated temperature and an elevated high pressure sufficient to promote the reactions desired in the crystalline zeolite reaction zone 106 without additional heating and compression maintained at an elevated pressure and a temperature within the range of 600° to 850° F. In the operation comprising zone 106 the composition of the material charged to the zeolite conversion zone and the product effluent obtained therefrom is defined in Table I below.

TABLE I

Processing of Total Fischer-Tropsch Synthesis Effluent Over ZSM5 Zeolite

| Composition, Wt % | Fischer-Tropsch Effluent | Product |
|---|---|---|
| Nitrogen | 16.1 | 16.1 |
| $H_2$ | 2.5 | 2.5 |
| CO | 2.0 | 2.0 |
| $CO_2$ | 32.2 | 32.2 |
| $CH_4$ | 17.0 | 17.0 |
| $H_2O$ | 8.0 | 8.3 |
| $C_2+$ | 21.0 | 22.0 |
| Oxygenates | 1.2 | 0.1 |
|  | 100.0 | 100.0 |
| $C_5$-400° F fraction, R+O | 55 | 92 |
| Propylene + Butylene | 8.0 | 1.1 |
| Isobutane | 0.0 | 1.0 |

The product effluent obtained from reaction zone 106 substantially reduced in oxygenates is then passed by conduit 107 to a first cooling and separation section 40' wherein the temperature is sufficiently reduced to separate a decant oil stream boiling above about 400° F from lower boiling material and removed therefrom by conduit 44'. The first cooling-separation zone 40' is maintained at a temperature within the range of 280° to 400° F. Material boiling below 400° F and comprising gaseous and liquid material is withdrawn by conduit 46' and passed to a final cooling-separation zone 48' maintained at a temperature of about 100° F. and a pressure of about 265 psig. In the final cooling step 48' a separation is made to recover $C_2$ and lower boiling gaseous components therefrom by conduit 54', a water phase comprising any oxygenates not converted by the zeolite catalyst recovered by conduit 50' and a normally liquid hydrocarbon phase boiling in the range of $C_5$ hydrocarbons up to an end point selected within the range of 400° to 500° F and recovered by conduit 109.

The normally liquid light oil hydrocarbon phase in conduit 109 is passed to a hydrocarbon separation section 70'. Relatively high boiling material boiling in the range of 400° to 650° F recovered as hereinafter defined from the decant oil phase by conduit 94' is also passed either alone or with the light oil phase to the separation section 70'. In the hydrocarbon separation section 70', a separation is made to recover $C_2$ fuel gases removed by conduit 72' and processed as discussed with respect to FIG. I. A $C_3$-$C_4$ rich fraction is recovered by conduit 80' for catalytic treatment to form gasoline boiling components as by polymerization, alkylation, or ZSM5 crystalline zeolite conversion in zone 82'. When available LPG products may be withdrawn by conduit 108. Gasoline boiling hydrocarbons thus catalytically formed from $C_5$ and lower boiling components are recovered from zone 82' by conduit 84' and combined with the gasoline product recovered from separation section 70' by conduit 86'. A light fuel oil such as a No. 2 fuel oil is recovered by conduit 88'. A heavier hydrocarbon fraction higher boiling than the desired light fuel oil is removed by conduit 90' and passed to a separation zone 92' such as a stream stripping-separation operation in admixture with the decant oil stream in conduit 44'. In stripping-separation zone 92' a heavy oil fraction is separated and removed therefrom by conduit 96'. A stripped oil product boiling in the range of 400° to 650° F is recovered by conduit 94' and passed to the hydrocarbon separation section 70' as discussed above.

In the improved combination operation of this invention, the total effluent of the Fischer-Tropsch effluent is separated from entrained catalyst fines by any of several different methods known in the art such as by electrostatic precipitation, electromagnetic precipitation, multiclone, sand filters or a combination thereof. The Fischer-Tropsch effluent at an elevated temperature and pressure thus separated from entrained fines is then cascaded for contact with the special crystalline zeolite catalyst such as a ZSM-5 crystalline zeolite containing catalyst in zone 106 maintained under conditions of temperature and pressure particularly promoting a number of different reactions comprising cracking, olefin isomerization, olefin cyclization, formation of alkyl aromatics, conversion of oxygenates to hydrocarbons and the conversion of waxy oil products under elevated hydrogen pressure conditions below about 1000 psig to lower boiling products including gas oils, naphthas and lower boiling normally gaseous material. The combined product thus formed comprises a wide spectrum of materials including high octane gasoline, light fuel oil and higher boiling materials boiling in the gas oil boiling range. The light fuel oil and higher boiling materials may be separately processed with a crystalline zeolite cracking catalyst in a fluid cracking operation such as a riser cracking operation. On the other hand, the material in the product effluent boiling above about 400° F may be separately processed over a catalyst comprising a ZSM-5 crystalline zeolite to form additional lower boiling components comprising gasoline. This latter processing concept is the subject of a separate copending application.

Having thus generally described the invention and discussed specific embodiments in support thereof, it is to be understood that no undue restrictions are to be imposed by reason thereof except as defined by the following claims.

I claim:

1. A method for upgrading products of Fischer-Tropsch synthesis comprising normally gaseous and liquid hydrocarbons in combination with organic oxygenates which comprises:

cascading the total effluent of a Fischer-Tropsch synthesis operation comprising nitrogen, hydrogen, carbon monoxide, carbon dioxide, methane, water, oxygenates and $C_2 +$ hydrocarbons through a catalyst fines removal zone to a zone containing a crystalline ZSM-5 zeolite conversion catalyst and maintained at an elevated pressure and temperature above 500° F, recovering a product effluent of said crystalline zeolite conversion operation comprising less organic oxygenates than the Fischer-Tropsch effluent charged therein and a gasoline product of substantially improved octane rating, recovering gaseous products of said crystalline zeolite conversion operation comprising $C_5$ and lower boiling components, catalytically upgrading said $C_5$ and lower boiling components to form gasoline boiling components and combining the gasoline boiling components thus formed with the gasoline product of improved octane recovered from said zeolite conversion operation.

2. The method of claim 1 wherein the gaseous products of said zeolite conversion operation are separated to recover a $C_3$–$C_4$ rich fraction which is catalytically converted to gasoline materials.

3. The method of claim 1 wherein the product effluent of said zeolite conversion is cooled to a temperature sufficient to recover material boiling generally above the gasoline boiling range, and said material boiling above gasoline is separated to recover a light fuel oil product fraction.

4. The method of claim 1 wherein the product effluent of said zeolite conversion is cooled to a temperature sufficient to separate a normally gaseous phase from a gasoline rich phase and a water phase and $C_5$ minus materials in the normally gaseous phase are catalytically upgraded to gasoline boiling components and blended with said gasoline rich phase.

5. The method of claim 1 wherein LPG materials are separated from gaseous products of the process.

* * * * *